US008484420B2

(12) United States Patent
Mall et al.

(10) Patent No.: US 8,484,420 B2
(45) Date of Patent: Jul. 9, 2013

(54) GLOBAL AND LOCAL COUNTS FOR EFFICIENT MEMORY PAGE PINNING IN A MULTIPROCESSOR SYSTEM

(75) Inventors: Michael Gerard Mall, Round Rock, TX (US); Bruce Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/957,351

(22) Filed: Nov. 30, 2010

(65) Prior Publication Data

US 2012/0137082 A1     May 31, 2012

(51) Int. Cl.
*G06F 12/02* (2006.01)
(52) U.S. Cl.
USPC ........... 711/133; 711/118; 711/170; 711/171; 718/104
(58) Field of Classification Search
USPC ................... 711/118, 133, 170, 171; 718/104
See application file for complete search history.

(56) References Cited

U.S. PATENT DOCUMENTS

| | | | |
|---|---|---|---|
| 6,430,180 B1 | 8/2002 | Bohm et al. | |
| 6,658,538 B2 | 12/2003 | Arimilli et al. | |
| 6,886,079 B2 | 4/2005 | Arimilli et al. | |
| 6,973,538 B2 * | 12/2005 | Khawand et al. | 711/130 |
| 7,437,513 B2 * | 10/2008 | Saida et al. | 711/128 |
| 8,326,824 B2 * | 12/2012 | Agrawal et al. | 707/719 |
| 2002/0166030 A1 * | 11/2002 | McKenney | 711/141 |
| 2006/0089951 A1 * | 4/2006 | Factor et al. | 707/200 |
| 2008/0270708 A1 | 10/2008 | Warner et al. | |
| 2009/0138955 A1 | 5/2009 | Vinayakray-Jani | |
| 2010/0115189 A1 | 5/2010 | Lin et al. | |
| 2011/0191561 A1 * | 8/2011 | Brassow | 711/163 |

OTHER PUBLICATIONS

Disclosed Anonymously, "Method for Efficient Token Translation Using Instance IDs", IP.com No. IPCOM000196502D, IP.com Electronic Publication, Jun. 3, 2010.
Hall et al., "Hardware for Fast Global Operations on Workstation Cluster Multicomputers", IEEE Proceedings of the 15th International Conference on Distributed Computing Systems, pp. 475-482, 1995.
Chen et al., "IBM Power 795 Technical Overview and Introduction", IBM Redbook, Nov. 2010. Available online at http://www.redbooks.ibm.com/redpieces/pdfs/redp4640.pdf.

* cited by examiner

*Primary Examiner* — Jae Yu
(74) *Attorney, Agent, or Firm* — James L. Baudino; Matthew B. Talpis

(57) ABSTRACT

Embodiments of the disclosure relate to the management of memory pages available for pin operations by groups of processors in a multiprocessor system to reduce cache contention and improve system performance. An exemplary embodiment comprises a system that may include interconnected processors, a global count of the number of pages available for pinning, and a plurality of local counts of pages available for pinning by groups of processors. Each local count may be in proximity to a processor group and include a subset of the pages allocated from the global count that are available for pinning by processors in the group. The local counts are adjusted accordingly in response to page pinning and unpinning by processors in the respective processor groups.

17 Claims, 7 Drawing Sheets

GLOBAL AND LOCAL COUNTS FOR EFFICIENT MEMORY PAGE PINNING IN A MULTIPROCESSOR SYSTEM

BACKGROUND

Embodiments of the invention relate generally to computer memory management. Specifically, the embodiments are directed to data processing systems, methods and computer program products for reducing cache line contention in a multiprocessor architecture.

Computer operating systems generally use a memory paging process to maximize the benefits of high-performance, but limited in size, system physical memory. The paging process allows processors to quickly access memory pages that the processors frequently need because the operating system maintains these pages in physical memory and does not need to fetch them from a slower data storage medium such as disk storage. In an advanced multiprocessor system, the amount of physical memory is relatively small compared to the number of pages that the processors may target to be resident in physical memory. As a result, an operating system may constantly move (or "page") data in and out of physical memory as requested by the processors or based on a page replacement algorithm. The pages that are maintained in physical memory and cannot be paged out are referred to as pinned pages. The pages that have been unpinned and may be paged out of physical memory are referred to as pageable or unpinned pages.

In order to fully utilize but not exceed physical memory capacity, the operating system may maintain a count field that contains the number of available physical memory pages that may be pinned by the processors in the system. The processors may request one or more pages from the count field when they pin memory pages. When a processor needs to pin a number of pages, it would compare the count field to the number of pages needed for the pin operation. If the count has sufficient pages available for pinning, the count is reduced by the number of pages that are pinned. Similarly, in an unpin operation, the count is increased by the number of pages that a processor unpins. In an advanced multiprocessor architecture, such a system count of the pages available for pinning leads to cache contention among the processors due to frequent accessing and updating of the count field, and interprocessor memory traffic, which in turn degrades system performance.

There is thus a need for a more efficient system and method for maintaining the count of memory pages available for pinning in a multiprocessor system.

BRIEF SUMMARY OF THE DISCLOSURE

Exemplary embodiments of the invention relate to memory management in a multiprocessor system. In particular, the embodiments relate to the use of global and local counts of pages that are available to groups of processors in the system for page pinning operations to reduce cache contention and improve system performance. One aspect of the disclosure concerns a system that may comprise a plurality of interconnected processors and a global count that includes the number of pages available for pinning by all the processors in the system. The system may further comprise a plurality of local counts of pages available for pinning by groups of processors. Each local count may be in proximity to a processor group and include an allocation of the pages from the global count that are available to the processors in the group for pinning. The local counts may be adjusted accordingly in response to page pinning and unpinning by the processors in the respective processor groups.

Another aspect of the disclosure concerns a computer implemented method for managing memory in a multiprocessor system. The method may comprise establishing a global count of the number of pages available for pinning in the system and maintaining a plurality of local counts wherein each local count is associated with a group of processors. Each local count may include an allocation from the global count of pages available to the processors in the group for page pin operations. The method may further comprise adjusting the local counts accordingly in response to page pin and unpin operations by the processors in the respective groups.

Still another aspect of the disclosure concerns a computer program product for managing memory in a multiprocessor system. The computer program product may comprise a computer readable storage medium having computer readable program code embodied therewith. The program code may be configured to establish a global count of the number of pages available for pinning in the system and maintain a plurality of local counts wherein each local count is associated with a group of processors. Each local count may include an allocation from the global count of pages that are available to the processors in the group for page pinning. The program code may be further configured to adjust a local count accordingly in response to page pin and unpin operations by the processors in the associated group.

The details of the embodiments of the disclosure, both as to their structure and operation, are described below in the Detailed Description section in reference to the accompanying drawings. The Brief Summary is intended to identify key features of the claimed subject matter, but it is not intended to be used to limit the scope of the claimed subject matter.

DETAILED DESCRIPTION OF THE DISCLOSURE

Figure 1:
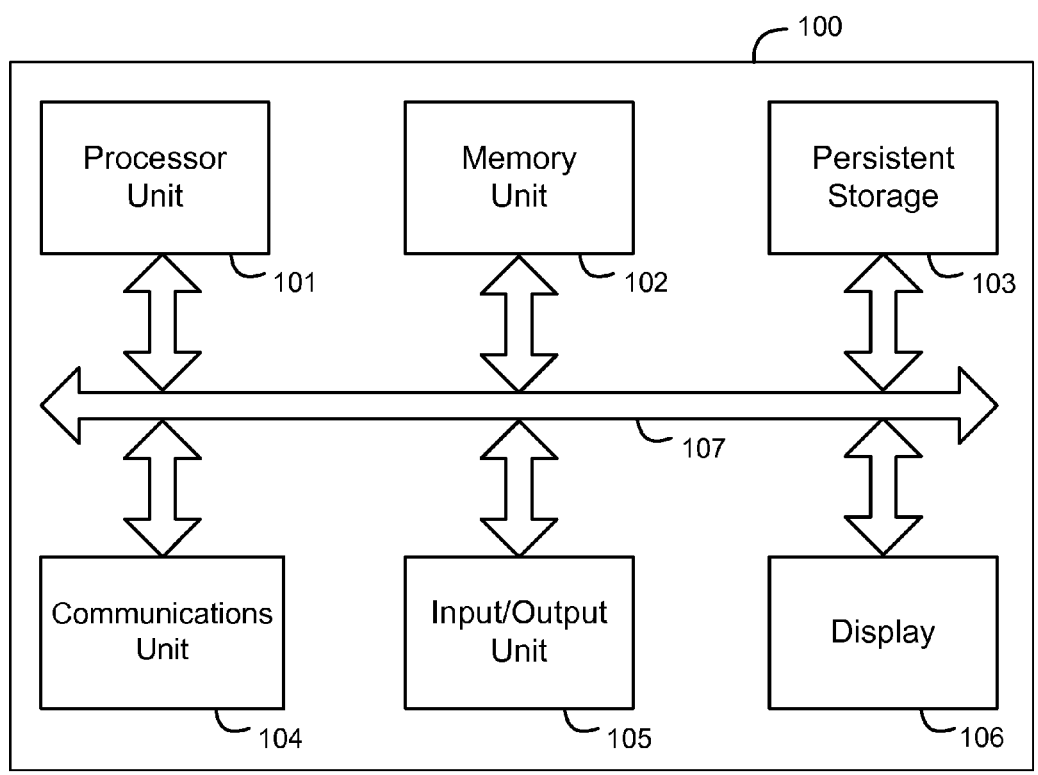
FIG. 1 illustrates a block diagram of a representative computer system in which aspects of the disclosure may be implemented.

Embodiments of the disclosure relate to memory management in a multiprocessor system. In particular, the embodiments relate to the use of local counts of pages available for pinning that are used by groups of processors for page pin and unpin operations. The local counts enable the processors in the system to reduce the frequency that they access a system global count of available pages when the processors pin and unpin pages in memory, thus minimizing cache contention and improving system performance. The local counts for the processor groups may be pre-allocated with portions of the number of pages available for pinning from the global count and adjusted accordingly as the processors in the respective groups request pages to be pinned or unpinned by the operating system. As a result of a page unpin operation, the operating system may return a number of pages available for pinning from a local count to the global count if the local count is above a certain threshold. In a reverse process, the operating system may move an additional number of pages available for pinning from the global count to a local count if the local count is below a minimum value, as a result of a page pinning operation.

Computer operating systems generally manage a system's memory space in fixed size units referred to as pages. A page is block of contiguous memory addresses. The default page size is typically 4096 bytes but may be of variable size in some advanced operating systems such as AIX®. AIX® is a trademark of International Business Machines corporation in the United States, other countries, or both. A virtual memory implementation may allow the operating system to provide processors with a memory space much larger than the available real memory in the system, and thus enables the execution of a larger number of programs concurrently. The virtual memory pages are mapped to real memory pages when the virtual addresses are translated to real (physical) addresses used by the hardware to process instructions.

A memory page may be in real memory or stored on disk (secondary storage) until it is needed by a program. When a program accesses a page that is not in real memory, a "page fault" condition occurs which causes the operating system to bring the desired page from disk into real memory in an operation referred to as paging-in. On the other hand, the operating system may move a page that is less frequently used by executing programs out to disk in an operation called paging-out. The paging operations are generally managed by a virtual memory management (VMM) component of the operating system, which is often referred to as a paging supervisor.

There are certain memory areas that must remain resident in real memory and not swapped out to secondary storage, such as interrupt-handling routines and data buffers directly accessed by peripheral devices in DMA operations. While executing programs, the processors in a multiprocessor system may request certain memory pages to be maintained in memory, i.e., pinned, in pinning operations. On the other hand, the processors may request certain pinned paged to be unpinned, i.e., available to be paged out of memory to disk storage by the operating system.

Due to the limited size of real memory, the operating system closely manages the number of pages that must stay resident in system memory, i.e., the pinned pages. As some of the pinned pages become unpinned, they are marked as unpinned pages and may be paged out of memory. To efficiently manage the page pinning and unpinning processes in a multiprocessor system, the operating system may maintain a global count of the number pages available for pinning that the processors in the system may request from to pin new pages while executing programs.

Referring now to the drawings and in particular to FIG. 1, there is illustrated a block diagram of the components in a computer system in which aspects of the invention may be implemented. Data processing system 100 may include one or more processors 101, one or more memory units 102, a persistent storage 103, a communications unit 104, an input/output unit 105, a display 106 and a system bus 107. Computer programs are typically stored in persistent storage 103 until they are needed for execution by an operating system (not shown) running in memory 102. At that time, the programs are brought into the memory 102 so that they can be directly accessed by the processor 101. The processor 101 selects a part of memory unit 102 to read and/or write by using an address that the processor 101 gives to memory 102 along with a request to read and/or write. Usually, the reading and interpretation of an encoded instruction at an address causes the processor 101 to fetch a subsequent instruction, either at a subsequent address or some other address. The processor 101, memory 102, persistent storage 103, communications unit 104, input/output unit 105, and display 106 interface with each other through the system bus 107.

Figure 2:
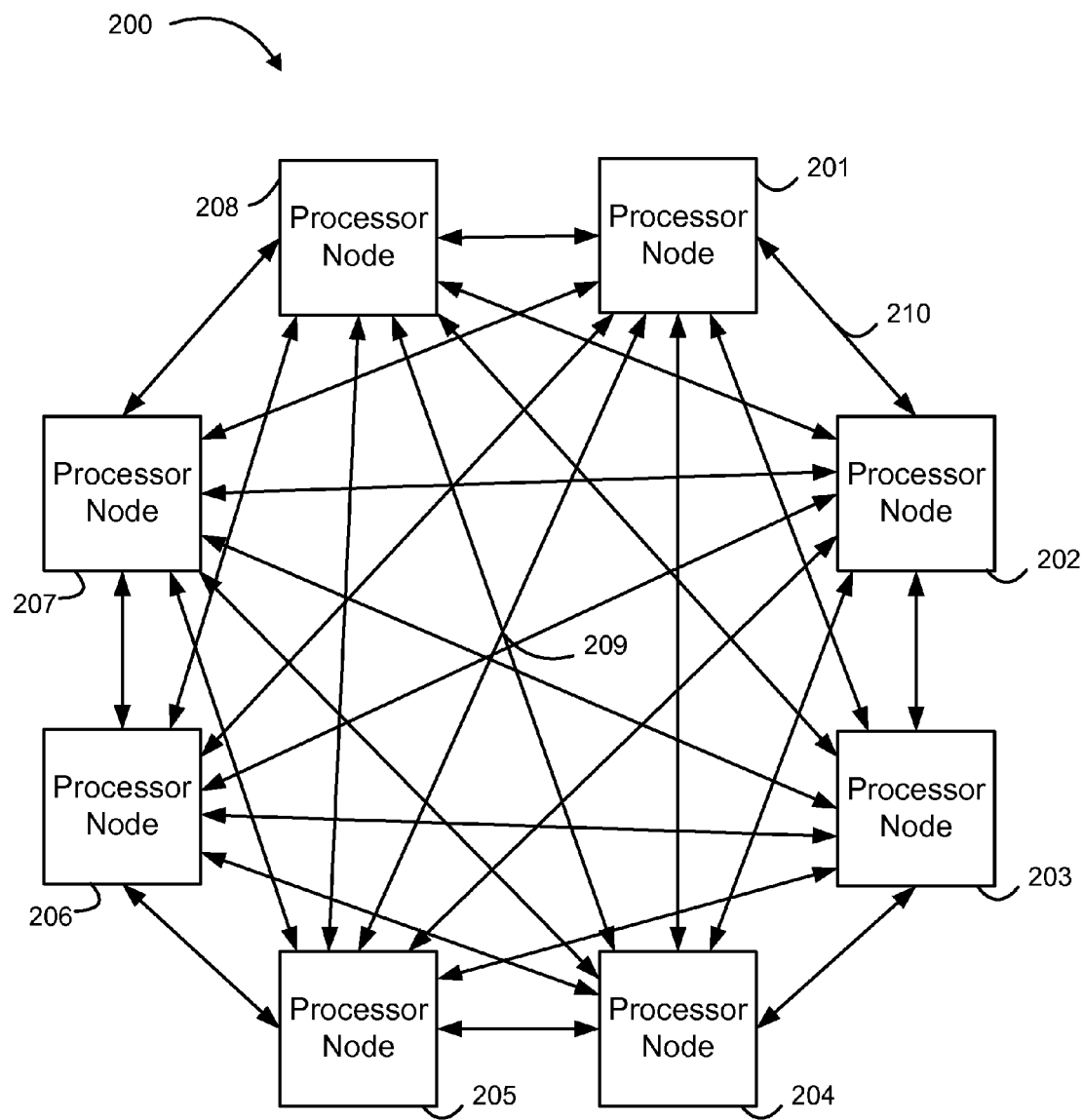
FIG. 2 illustrates an exemplary multiprocessor configuration having multiple processing nodes in which aspects of the disclosure may be implemented.

FIG. 2 illustrates an exemplary multiprocessor configuration having multiple processing nodes in which aspects of the disclosure may be implemented. The multiprocessor configuration in FIG. 2 is presented only by way of example and is not intended to be limiting. The page pin and unpin systems and methods disclosed herein may be applicable to a wide variety of different computers, servers, storage systems, and network architectures. Processor nodes 201-208 are interconnected by connection buses such as connection buses 209-210 to allow workload sharing among the processor nodes 201-208 and concurrent execution of programs in the processor nodes. Each of the processor nodes 201-208 may include multiple processor chips, and each processor chip may further comprise multiple processing units (CPUs or cores), as described below.

Figure 3:
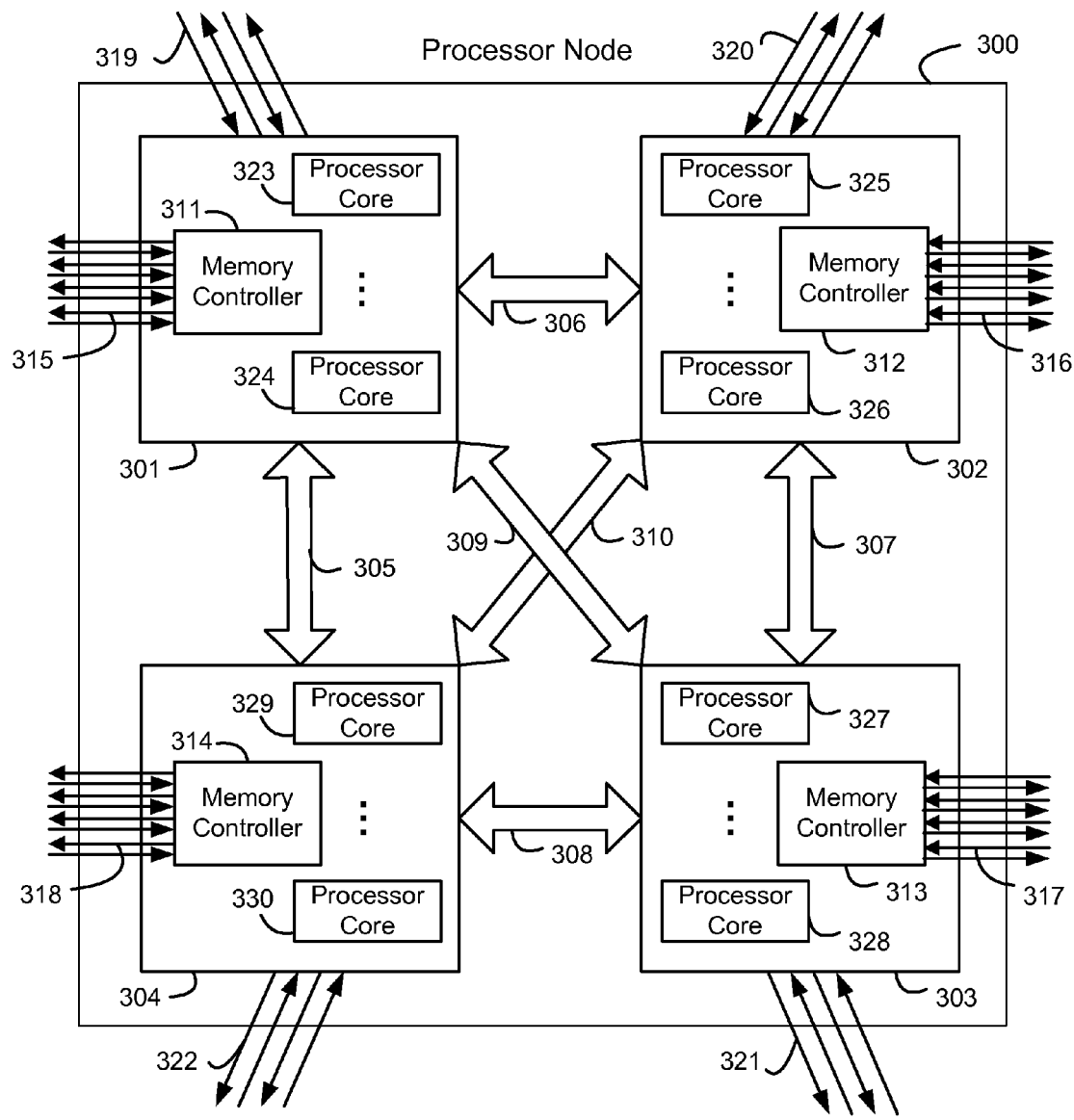
FIG. 3 illustrates an exemplary processor node that comprises multiple processor chips in which aspects of the disclosure may be implemented.

FIG. 3 illustrates an exemplary processor node that includes multiple processor chips in which aspects of the disclosure may be implemented. Processor node 300 may comprise four processor chips 301-304 that are interconnected through intra-node fabric buses 305-310. Each processor chip 301-304 may include one or more memory controllers 311-314 for interfacing with memory components (not shown) through data and control paths 315-318. Each processor chip 301-304 may further have inter-node fabric buses 319-322 for communicating with the processor chips on other interconnected processor nodes. In advanced multiprocessor systems such as IBM Power7® systems, each processor chip 301-304 may include multiple processing units (cores) 323-330, e.g., 8 cores in each of the processor chips 301-304 as shown in FIG. 3.

Figure 4:
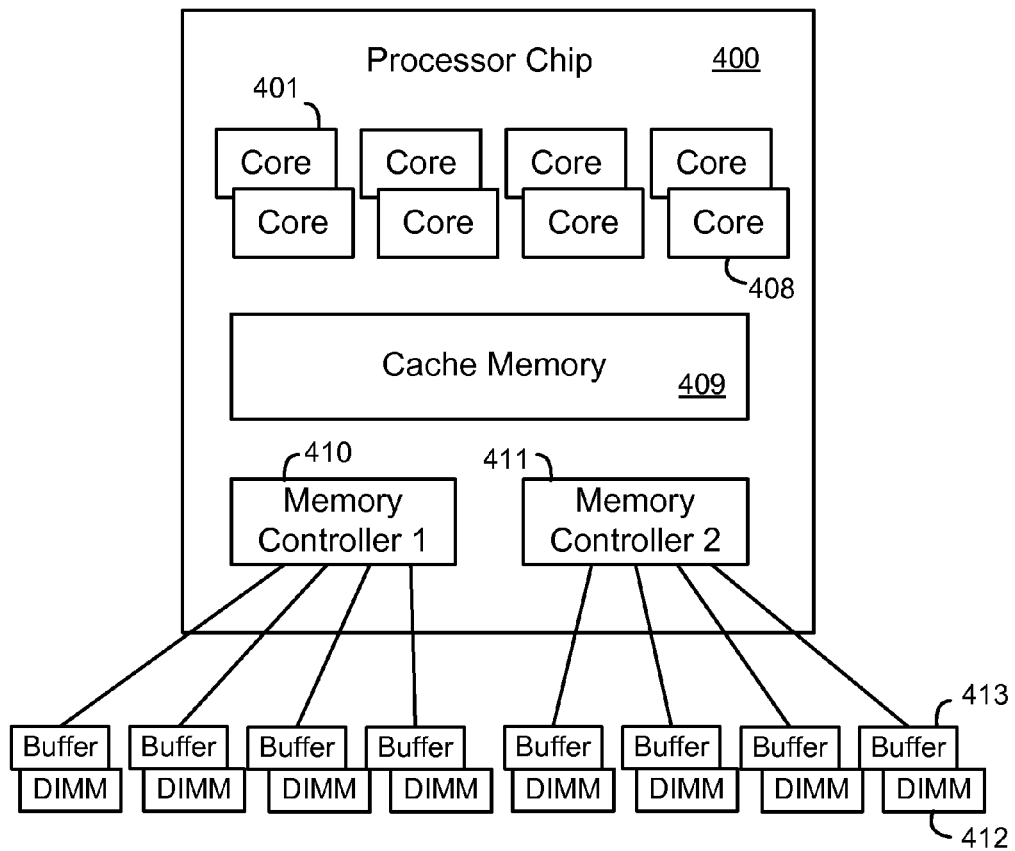
FIG. 4 illustrates an exemplary processing chip that comprises multiple processor cores in which aspects of the disclosure may be implemented.

FIG. 4 illustrates an exemplary processor chip that comprises multiple processing cores in which aspects of the disclosure may be implemented. Processor chip 400 may include a number of cores 401-408 for concurrently executing program instructions. The cores 401-408 may be interconnected for workload sharing and may be further connected to cache memory 409 and memory controllers 410-411. Memory controllers 410-411 allow cores 401-408 to store data to and read data from memory units 412 (e.g., DIMMs) and buffers 413 during the execution of the program instructions.

Figure 5:
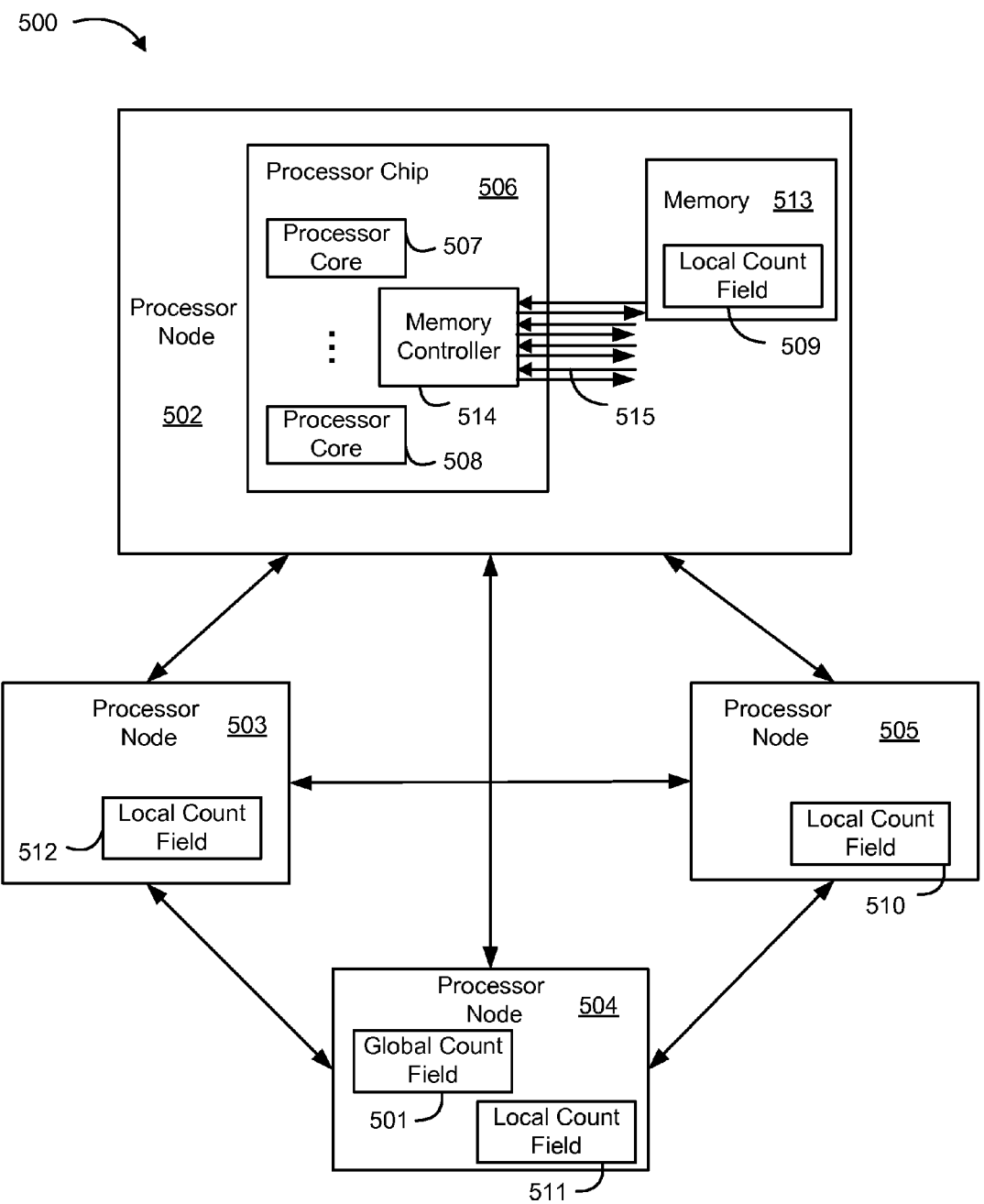
FIG. 5 illustrates a block diagram of a multiprocessor system having a global count field and multiple local count fields for providing aspects of the disclosure, according to an exemplary embodiment.

FIG. 5 illustrates a block diagram of a multiprocessor system having a global count field and multiple local count fields of available pages, for providing aspects of the invention according to an exemplary embodiment. Multiprocessor system 500 may comprise multiple processor nodes 502-505, multiple processor chips 506 in each processor node 502-505, and multiple cores 507-508 in each processor chip 506, as illustrated in FIGS. 2-4. An operating system running in the system 500 may maintain a global count field 501 that contains the number of pages available for pinning by all cores 507-508 in the multiprocessor system 500. As an example, each processor chip 506 may maintain a local count field 509 in memory 513 that contains a portion of the pages available for pinning from the global count field 501. The processor cores 507-508 on processor chip 506 may access the local count field 509 through memory controller 514 and memory bus 515. The pages available for pinning in the local count field 509 are available to the cores 507-508 in the processor chip 506 for pinning pages, for example, in memory 513, while the cores 507-508 are executing program instructions. Other processor chips in the system 500 may also maintain local counts of available pages for pinning by cores in the respective chips, such as local count fields 510-512.

In an embodiment of the invention, the local count fields 509-512 may be pre-allocated with portions of the number of pages available for pinning from the global count field 501. Whenever a core 507-508 needs to pin one or more pages in memory, the core 507-508 may check the local count field 509 to determine whether there are sufficient available pages in the local count 509 to process the pin operation. If there are sufficient remaining pages in the local count field 509, then the operating system pins the requested pages, reduces the value of the local count field 509 by the requested number of pinned pages, and updates the local count 509 with the remaining count of pages available for pinning. If the local count field 509 does not sufficiently have the requested number of pages to be pinned, then the operating system may allocate additional pages from the global count field 501 to the local count field 509 in order to process the pinning operation. In case the global count field 509 does not have sufficient available pages to satisfy the pin request, then the pin request fails, i.e., the operating system rejects the pin request.

In a reverse process, whenever a processing core 507-508 needs to unpin one or more pages from memory 513, the operating system may increase the value of the local count field 509 by the requested number of pages to be unpinned and update the local count field 509 with the new count of pages available for pinning. If the new count of pages available for future pin requests exceeds a certain upper threshold, then the operating system may return the difference between the new count and upper threshold to the global count field 501. In order to minimize contention in accessing a local count field 509, the processing cores 507-508 in a group may employ atomic operations to update the local count field 509 when the processors need to update the local count 509 simultaneously. Atomic operations may be implemented using locks.

Figure 6:
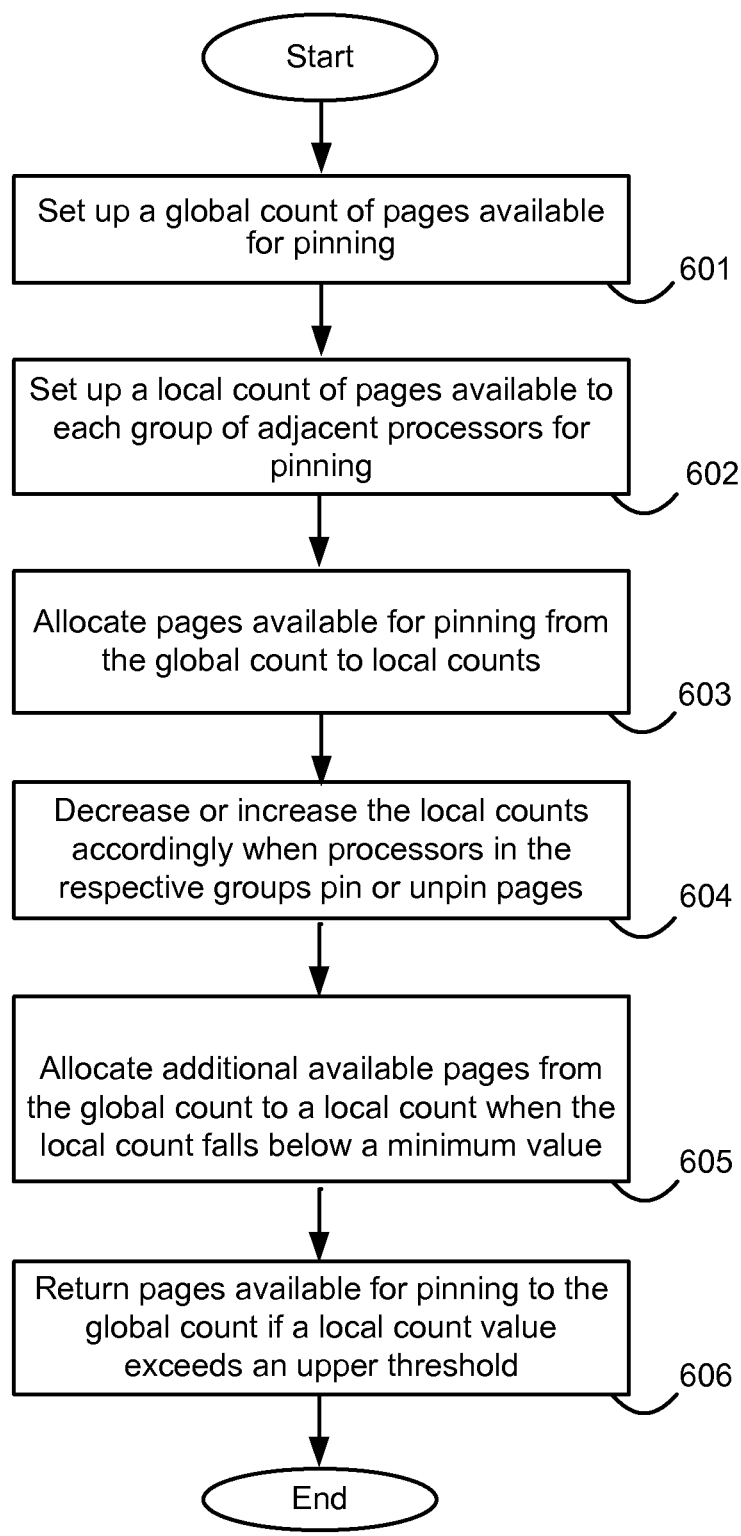
FIG. 6 illustrates a flowchart of an exemplary process for reducing cache contention in a multiprocessor system using a global count field and multiple local count fields, according to an exemplary embodiment.

FIG. 6 illustrates a flowchart of an exemplary process for minimizing cache contention in a multiprocessor system using a global count field and multiple local count fields for page pin and unpin operations, according to an exemplary embodiment of the invention. The process may begin at step 601 with the operating system setting up a global count of the number of pages available for pinning in the system based on available memory resources. In an exemplary embodiment, which may be applicable to IBM Power7® multiprocessor systems, the global count field may arbitrarily be associated with one processor or group of processors at the start-up of an operating system. The operating system may further set up a local count field of the number of pages available for pinning for each group of adjacent processors in the system, at step 602. A processor group may comprise a single processor or a subset of the processors in the system, such as those on a processor chip or a processor node, as described above with reference to FIGS. 2-5.

At step 603, the global count of pages available for pinning in the system may be distributed among multiple local count fields of pages available for pinning by groups of adjacent processors. The value of each local count field thus indicates the current number of pages available to the processors in the respective group for pinning pages in memory. Whenever a processor in a group requests one or more pages to be pinned, the operating system examines the associated local count field, pins the requested number of pages in memory, and reduces the local count by the requested number of pinned pages, at step 604.

Similarly, when a processor requests one or more pages to be unpinned from memory, the operating system would unpin the requested number of pages and increase the local count associated with the processor's group by the requested number of unpinned pages. In order to maximize the benefits of memory, and minimize cache and memory contention and traffic on system buses, the operating system may periodically allocate additional pages available for pinning from the global count to a local count to maintain it above a certain minimum value, per step 605. On the other hand, if a local count of pages available for pinning exceeds a certain upper limit as a result of an unpin operation when the number of unpinned pages is added to the local count, the operating system may return the number of pages above the upper limit to the global count field, per step 606. Further details on an exemplary process for adjusting the local count fields are described below with reference to FIG. 7.

Figure 7:
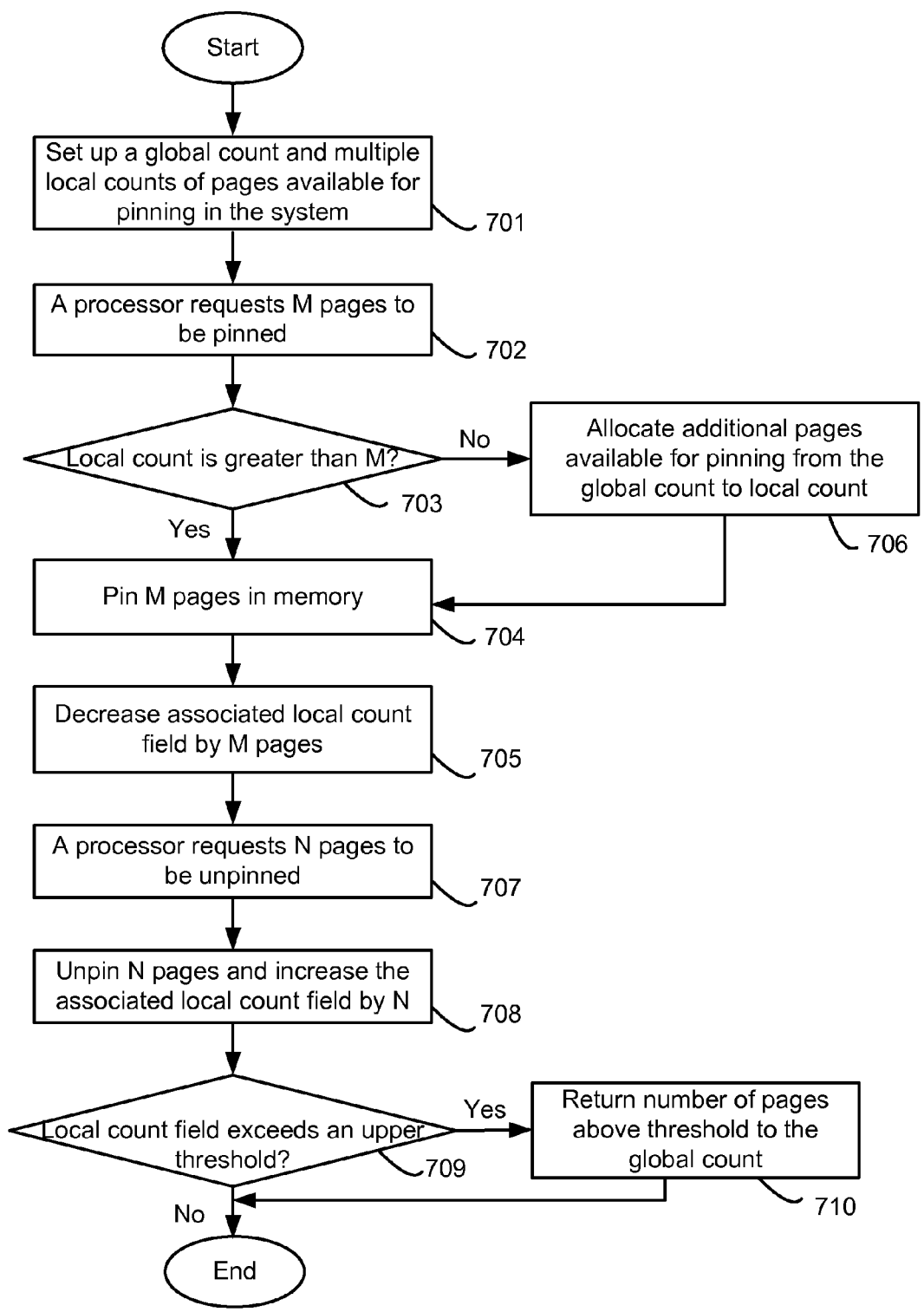
FIG. 7 illustrates a flowchart of an exemplary process for managing the global and local counts of pages available for pinning to minimize cache contention in a multiprocessor system, according to an embodiment.

FIG. 7 illustrates a flowchart of an exemplary process for managing the global and local counts of pages available for pinning to minimize cache contention in a multiprocessor system, according to an embodiment of the invention. At step 701, the operating system may set up a global count field for the system, and multiple local count fields for groups of adjacent processors in the system, as described with reference to FIG. 6. As an example, a processor in a processor group may request a number (M) of pages to be pinned at step 702.

In response to the processor's request, the operating system may examine the local count field associated with the processor's group to determine whether there are currently sufficient pages available for pinning in the local count field to satisfy the request, at step 703. In other words, the operating system determines whether the current value of the local count is equal to or larger than M. If the requested number of pages to be pined is available per the determination, then the operating system may process the pin operation at step 704 and decrease the local count by the requested number (M) of pinned pages at step 705. Otherwise, the operating system may allocate additional pages available for pinning from the global count to the local count field being examined to satisfy the processor's request, and to keep the local count above a minimum threshold value, per step 706.

In a reverse operation, a processor in a processor group may request a number (N) of pages to be unpinned during its execution of program instructions at step 707. In response to the processor's request, the operating system may unpin (N) pages from memory and increase the group's local count field of the pages available for pinning by (N), at step 708. The operating system may further determine at step 709 whether the updated value of the local count field now exceeds a predetermined upper limit in order to avoid keeping too many available pages for the group that the processors in the group may not need. If the new local count is above the upper threshold, the operating system may return the surplus number of pages available for pinning to the global count field and reduce the local count value to the upper threshold, per step 710. In order to minimize contention in accessing a local count by processors in a group, the processors may employ atomic operations to update the local count when they need to update the local count simultaneously. Atomic operations may be implemented using locks.

The returned pages available for pinning in the global count may then be allocated to other processor groups in the system as needed. The values of the global count for the system and local counts for the groups are thus dynamically adjusted during the operation of the processors to fully utilize the system memory, while minimizing cache memory contention and reducing traffic on inter-processor and inter-node buses.

As will be appreciated by one skilled in the art, aspects of the present disclosure may be embodied as a method, system or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and substitutions of the described components and operations can be made by those skilled in the art without departing from the spirit and scope of the present disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A data processing system comprising:
    a plurality of interconnected processors;
    a global count of pages available to the processors in the system for pinning a page in memory;
    a plurality of local counts respectively associated with groups of the processors, wherein each local count includes an allocation from the global count, is available to the processors in an associated group for page pinning, and is adjusted accordingly in response to page pinning and unpinning by the processors in the associated group, wherein each said local count is decreased by the number of pages to be pinned by a first processor in the associated group and increased by the number of pages to be unpinned by a second processor in the associated group.

2. The system of claim 1, wherein a pinned page remains resident in the memory and an unpinned page is available to be paged out to a secondary storage.

3. The system of claim 1, wherein each said local count has an upper threshold, and responsive to an unpin operation, a number of pages available for pinning above the upper threshold is returned to the global count.

4. The system of claim 1, wherein each said local count has a lower threshold, and responsive to a pin operation, an additional number of pages available for pinning is taken from the global count to each said local count if the local count falls below the lower threshold.

5. The system of claim 1, wherein the processors in the associated group use an atomic operation to update each said local count when the processors in the associated group update each said local count simultaneously.

6. The system of claim 1, wherein each said local count is maintained in a physical memory local to the associated group of the processors.

7. The system of claim 1, further comprising a plurality of interconnected nodes each including a group of the processors.

8. The system of claim 1, wherein each said local count is maintained for each processor in the system.

9. The system of claim 1, wherein the global count and local counts are handled by an operating system running in the data processing system.

10. The system of claim 9, wherein the operating system is a UNIX operating system.

11. The system of claim 9, wherein the operating system is an AIX operating system.

12. A computer implemented method for managing memory in a multiprocessor system, comprising:
    establishing a global count of the number of pages available for pinning in the system;
    maintaining a plurality of local counts each associated with a group of processors, wherein each local count includes an allocation from the global count and the allocation is available to the processors in the associated group for page pinning;
    adjusting each local count accordingly in response to page pin and unpin operations by the processors in the associated group; decreasing each local count by the number of pages to be pinned by a first processor in the associated group; and
    increasing each local count by the number of pages to be unpinned by a second processor in the associated group.

13. The method of claim 12, wherein each local count has an upper threshold, and responsive to an unpin operation by a processor in the associated group, the method returns to the global count any number of pages available for pinning that exceeds the upper threshold.

14. The method of claim 12, wherein each local count has a lower threshold, and the method allocates an additional number of pages available for pinning from the global count to said local count if said local count falls below the lower threshold.

15. A computer program product for managing memory in a multiprocessor system, comprising a computer readable storage medium having computer readable program code embodied therewith and configured to:
    establish a global count of pages available for pinning in the system; maintain a plurality of local counts each associated with a group of processors, wherein each said local count includes an allocation from the global count and the allocation is available to the processors in the associated group for page pinning; and
    adjust each said local count accordingly in response to page pin and unpin operations by the processors in the associated group, wherein each said local count is decreased by the number of pages to be pinned by a first processor in the associated group and increased by the number of pages to be unpinned by a second processor in the associated group.

16. The computer program product of claim 15, wherein each said local count is maintained in physical memory in proximity to the associated group of processors.

17. The computer program product of claim 15, wherein the multiprocessor system is an AIX based system.

* * * * *